United States Patent
Hamilton et al.

(10) Patent No.: US 8,910,240 B1
(45) Date of Patent: Dec. 9, 2014

(54) MAPPING CONTENT USING UNIFORM RESOURCE IDENTIFIERS

(75) Inventors: Jeffrey W. Hamilton, Austin, TX (US); Dianne K. Hackborn, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 1705 days.

(21) Appl. No.: 11/938,689

(22) Filed: Nov. 12, 2007

(51) Int. Cl.
  G06F 21/00 (2013.01)
  G06F 21/62 (2013.01)

(52) U.S. Cl.
  CPC ............ *G06F 21/62* (2013.01); *G06F 21/6218* (2013.01)
  USPC .................................. 726/2; 726/17

(58) Field of Classification Search
  USPC .............. 707/705, 716, 786; 726/17
  See application file for complete search history.

(56) References Cited

U.S. PATENT DOCUMENTS

| | | | |
|---|---|---|---|
| 6,243,443 | B1 | 6/2001 | Low et al. |
| 6,853,982 | B2 | 2/2005 | Smith et al. |
| 7,876,748 | B1 | 1/2011 | Conner et al. |
| 2002/0133535 | A1* | 9/2002 | Lucovsky et al. ............ 709/201 |
| 2002/0156802 | A1* | 10/2002 | Takayama et al. ............ 707/500 |
| 2006/0161554 | A1* | 7/2006 | Lucovsky et al. ............... 707/10 |
| 2006/0236100 | A1* | 10/2006 | Baskaran et al. ............ 713/165 |
| 2006/0259941 | A1* | 11/2006 | Goldberg et al. ............ 725/132 |
| 2007/0256048 | A1* | 11/2007 | Relyea et al. ................. 717/100 |
| 2008/0091830 | A1* | 4/2008 | Koshino et al. ............... 709/227 |

FOREIGN PATENT DOCUMENTS

| | | |
|---|---|---|
| EP | 1521472 | 4/2005 |
| EP | 1675023 | 6/2006 |
| EP | 1771004 | 4/2007 |
| WO | WO 0215531 | 2/2002 |
| WO | WO 0239286 | 5/2002 |
| WO | WO 2008/023918 | 2/2008 |

\* cited by examiner

*Primary Examiner* — Edward Zee
*Assistant Examiner* — Chi Nguy
(74) *Attorney, Agent, or Firm* — Fish & Richardson P.C.

(57) ABSTRACT

The subject matter of this specification can be embodied in, among other things, a method that includes specifying, with uniform resource identifiers (URIs), substantially all data accessible by applications on a device. The method also includes receiving at a universal interface a request from an application on the device for data that is specified by a URI associated with the request. Substantially all requests for data from applications on the device are received at the universal interface. The method also includes determining, based on the URI associated with the request, a content provider responsible for managing the requested data, and outputting the requested data to the application using the determined content provider to obtain the requested data based on the URI associated with the request.

20 Claims, 9 Drawing Sheets

MAPPING CONTENT USING UNIFORM RESOURCE IDENTIFIERS

TECHNICAL FIELD

This instant specification relates to accessing data on a device.

BACKGROUND

Electronic content can be stored on devices in different ways. For example, a first application running on a desktop computer can store its files in using a first method and a second application running on the desktop computer can store its files using a second different method. The different methods may use different parameters and commands to store or write the data for the applications. Additionally, the file structure of the stored data can be different for different applications.

SUMMARY

In general, this document describes specifying substantially all data stored on a device using uniform resource identifiers (URIs). In some implementations, applications on a device can submit requests for data to a universal interface that retrieves the data using URIs associated with the submitted requests.

In a first general aspect, a computer-implemented method is described. The method includes specifying, with uniform resource identifiers (URIs), substantially all data accessible by applications on a device. The method also includes receiving at a universal interface a request from an application on the device for data that is specified by a URI associated with the request. Substantially all requests for data from applications on the device are received at the universal interface. The method also includes determining, based on the URI associated with the request, a content provider responsible for managing the requested data, and outputting the requested data to the application using the determined content provider to obtain the requested data based on the URI associated with the request.

In a second general aspect, a system is described, which includes an application to transmit a request having a uniform resource identifier (URI) associated with data and a data store that is accessible for storing and retrieving the data. Substantially all data that is accessible by applications on a device is specified using URIs. The system also includes means for determining, based on the URI associated with the request, a content provider responsible for managing the requested data and outputting the requested data to the application using the determined content provider to obtain the requested data based on the URI associated with the request.

The systems and techniques described here may provide one or more of the following advantages. First, a system can provide a universal interface to simplify the handling of requests from applications. Second, a flexible query method that can return groups of data based on a hierarchical structure of a query is provided. Third, an application can request data originating from a different application without having information regarding where or how the data was stored by the different application.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for retrieving and storing substantially all data on a device using uniform resource identifiers (URIs). In some implementations, every piece of content has a string that uniquely identifies it. Different applications can retrieve data stored on the device using a single mechanism, namely, by specifying the data with a URI. For example, a first application can retrieved data generated and stored on the device by a second application by specifying the data with a URI regardless of whether the first application knows how or exactly where the second application stored the data.

In some implementation, the URI has a hierarchal structure that permits applications to specify the type of data to retrieve (or store). For example, a URI "content://contacts/phones/Bob can indicate that the data specified by the URI is a phone number for a user Bob that is stored as contact information.

A first application can request Bob's phone number(s) by passing the URI to a universal interface that accepts substantially all application requests for storing or retrieving data. The universal interface can identify a content provider responsible for managing the phone number(s) associated with the URI. The content provider can then service the request. For example, the content provider can pass requested phone number(s) specified by the URI to the first application via the universal interface. This may provide a uniform way to access substantially all content on the device regardless of what application generated the information or what application is requesting the information.

Figure 1:
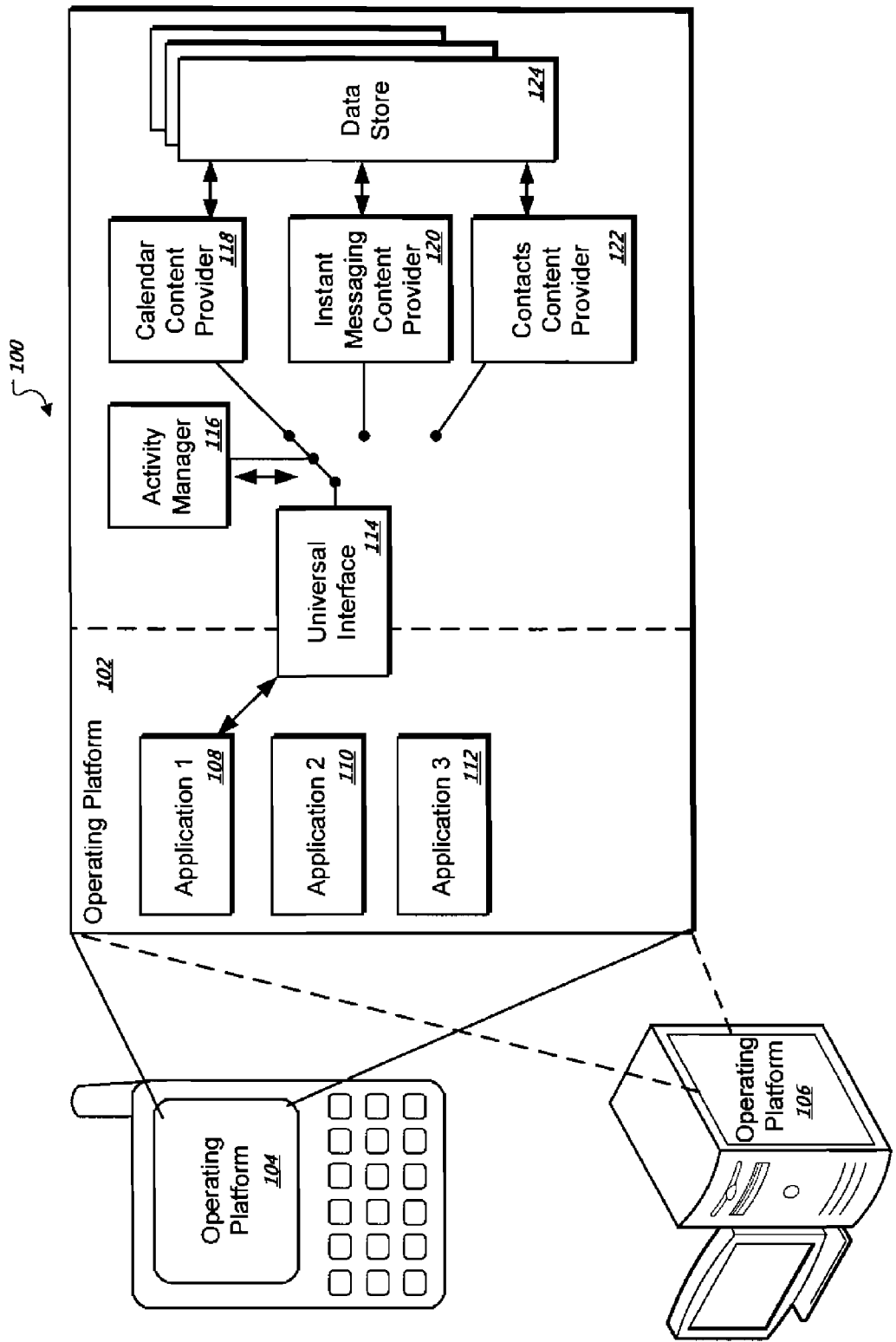
FIG. 1 is schematic diagram showing an exemplary system for addressing substantially all content stored on a device through a universal interface.

FIG. 1 is schematic diagram showing an exemplary system 100 for addressing substantially all content stored on a device through a universal interface. The system 100 includes an operating platform 102 that can be installed, for example, on a mobile device 104 or a desktop computer 106. For simplicity of explanation, the remaining implementations will be described as if the operating platform 102 is installed upon a mobile device 104 although this example is not intended to be limiting. In some implementations, the mobile device 104 is a cell phone that includes the operating platform 102.

The operating platform 102 can include applications 108, 110, 112. The operating platform 102 can also include the universal interface 114 used by the applications 108, 110, 112 to request operations on data. For example, each of the applications communicates with the universal interface 114 when the application attempts to store data to or retrieve data from the mobile device 104.

Additionally, the operating platform can include an activity manager 116 that selects content providers 118, 120, 122, that managed data stored on the device 144. In some implementations, the content providers 118, 120, 122 can interface with a data store 124 to retrieve or store data.

FIG. 1 illustrates one implementation of the relationship between the applications 108, 110, 112, the universal interface 114, the activity manager 116, and the content providers 118, 120, 122. In this implementation, the applications 108, 110, 112 communicate requests to the universal interface. The universal interface 114, in turn, communicates with a particular content provider that is determined by the activity manager 116 based on the requests. FIG. 1 illustrates this behavior using a switch controlled by the activity manager 116 that connects the universal interface 114 to the appropriate content provider based on information included in a particular request. The selected content provider can service the request transmitted by the application and return any resulting information to the universal interface 114, which in turn communicates the resulting information to the requesting application.

For example, application 1 108 may be a datebook application that displays events occurring on certain days. If the datebook application needs to display events occurring on Nov. 8, 2007, the datebook application 108 can submit a URI that specifies events on this day to the universal interface 114.

The URI also can include information that specifies a content provider responsible for managing the event data. In some implementations, the activity manager 116 can use this specifying information within the URI to identify an appropriate content provider, which in this case is the calendar content provider 118.

Once the appropriate content provider is identified, the universal interface 114 (or the activity manager 116) can transmit the URI to the calendar content provider. The calendar content provider 118 can use additional information included in the URI to access the requested events on Nov. 8, 2007 from the data store 124. The calendar content provider 118 then transmits the requested data to the universal interface 114, which transmits the requested event data to the datebook application 108. The datebook application can then display the requested event data for events occurring on Nov. 8, 2007 to a user of the mobile device 104.

Figure 2:
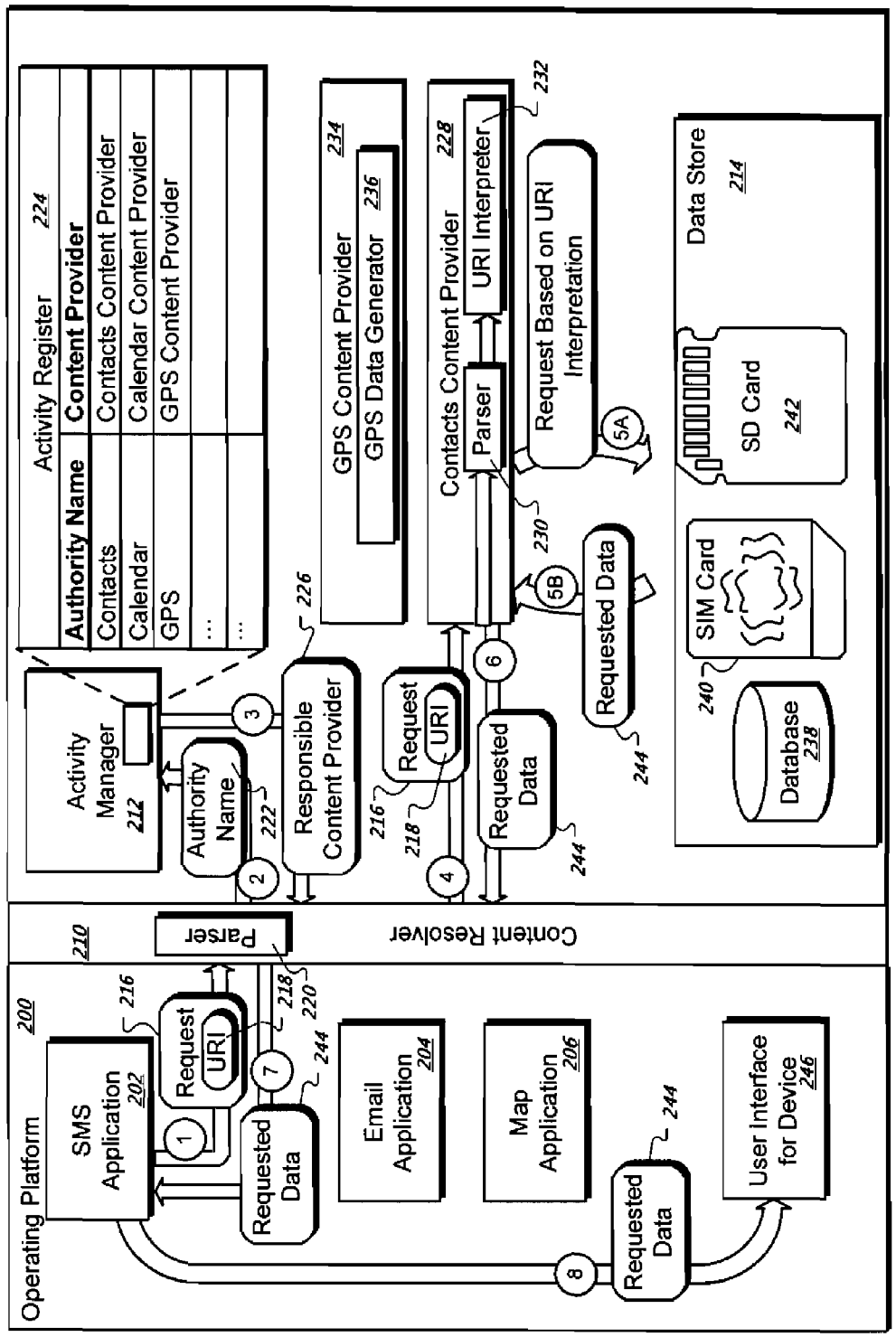
FIG. 2 is a box diagram showing an operating platform for specifying substantially all content on a device using URIs.

FIG. 2 is a box diagram showing an operating platform 200 for specifying substantially all content on a device using URIs. The operating platform 200 includes applications such as a Short Messaging Service (SMS) application 202, an email application 204, and a map application 206. The operating platform also includes a content resolver 210, an activity manager 212, content providers, and a data store 214.

FIG. 2 shows an exemplary sequence of events executed on the operating platform 200, where the sequence is indicated by circled numbers. The exemplary sequence is used for purposes of explanation and is not intended to limit an order in which actions can occur on the operating platform 200. For example, one or more of the actions executed on the operating platform 200 can occur in parallel.

The example shown in FIG. 2 depicts events that can occur when the SMS application 202 requests data stored on a mobile device running the operating platform 200. In this example, the SMS application 202 submits a request for phone numbers that the SMS application can use to transmit a SMS message. For example, the application can present the requested phone numbers to a user. The user can select one or more of the phone numbers and transmit a SMS message to cell phones (or other mobile devices) addressed by the phone numbers.

In a first step of this example, the SMS application 202 transmits a request 216 to the content resolver 210. The request 216 can include a URI 218 that specifies that the data requested is a list of telephone numbers. An example of the URI is content://contacts/phone where the prefix "content" indicates that the requested data is stored locally on the device, the string "contacts" indicates a content provider to service the request, and the string "phone" indicates the type of data—namely—that the data is a phone number.

The content resolver 210 includes a parser 220 that parses the URI 218 to determine, for example, an authority name 222 present within the URI 218. In some implementations, the authority name 222 is the string that indicates a content provider to service the request and follows the "://" symbol within the URI.

In a second step, after parsing out the authority name, the content resolver 210 can transmit the authority name 222 to the activity manager 212. The activity manager 212 can access an activity register 224 that links authority names to content providers. For example, if the authority name is "contacts," activity manger 212 can access the activity register 224 to determine that the associated content provider is the "contact content provider." In another example, if the authority name is "calendar," the activity manager 212 can determine that the associated content provider is the "calendar content provider."

In a third step, after determining the appropriate content provider based on the received authority name, the activity manager 212 can transmit information 226 identifying the responsible content provider back to the content resolver 210.

In the fourth step, the content resolver 210 can transmit the request 216 having a URI 218 to the identified content provider. In this example, the identified content provider is the contacts content provider 228 because the authority name is "contacts."

In some implementations, the contacts content provider 228 can parse the received URI 218 using a parser 230. The parsed URI information can be transmitted to a URI interpreter 232 that determines an action for the contact content provider 228 to perform. In this example, the requested action is to return data stored in the data store 214. In other examples, the requested action may include requesting the content provider to store data that is included with the request or to generate data.

In a fifth step, the contacts content provider 228 can use the URI 232 associated with the request from the application to retrieve data stored in the data store 214. For example, the URI 232 can logically indicate one or more pieces of content stored in a database 238, a Subscriber Identity Module (SIM) card 240 of a cell phone, or a secure digital (SD) card 242 inserted within the mobile device.

In some implementations, the operating platform 200 can also include a URI resolver (not shown) which translates a hierarchical string of the URI 218 into a physical memory location in a substantially similar way that internet domain names are resolved to internet protocol (IP) addresses or that logical memory addressing is resolved to physical memory addressing.

Regardless of how the URI is resolved to a physical memory location, the contact content provider 228 accesses the physical memory location to retrieve the requested data 244. In a sixth step, the contacts content provider 228 returns the requested data 244 to the content resolver 210, which in turn transmits the requested data 244 to the SMS application in a seventh step.

The SMS application 202 can display or use the requested data in an eighth step. For example, the requested data includes phone numbers for contacts stored on the mobile device. The SMS application can transmit a list of phone numbers to a user interface 246 for the device. A user can select one of the phone numbers as an addressee of an SMS message that a user has composed on the device.

As mentioned briefly above, the request transmitted by the application can initiate a content provider to perform actions other than retrieving stored data. For example, a map application 246 can transmit a request for Global Positioning System (GPS) data (e.g., for use in displaying on a map a current location of the mobile device running the operating platform). Assuming GPS content provider is selected to receive the request, a URI associated with the request can initiate a set of actions that cause the GPS data generator 236 to generate (not retrieve from storage) current GPS data for use by the map application 246. For example, the GPS data generator 236 can request that a GPS transceiver (not shown) receive GPS signals that the GPS data generator 236 subsequently uses to calculate a current location of the mobile device.

In some implementations, multiple and different applications can use the same content provider. For example, the e-mail application 206 can submit a request for email addresses stored on the mobile device in order to display the email addresses to a user. The email address data can be managed by the contacts content provider 228. Consequently, the request for email addresses includes a URI that includes the authority name "contacts." The activity manager uses the authority name to identify that the contacts content provider should manage the request for email addresses (as well as managing other contact related data such as the telephone numbers described previously).

The remaining portion of the URI besides the authority name can identify the particular data requested from the content provider. For example, if the complete URI is "content://contacts/email," the "email" string can indicate that the data requested is all the email addresses stored on the device.

Figure 3:
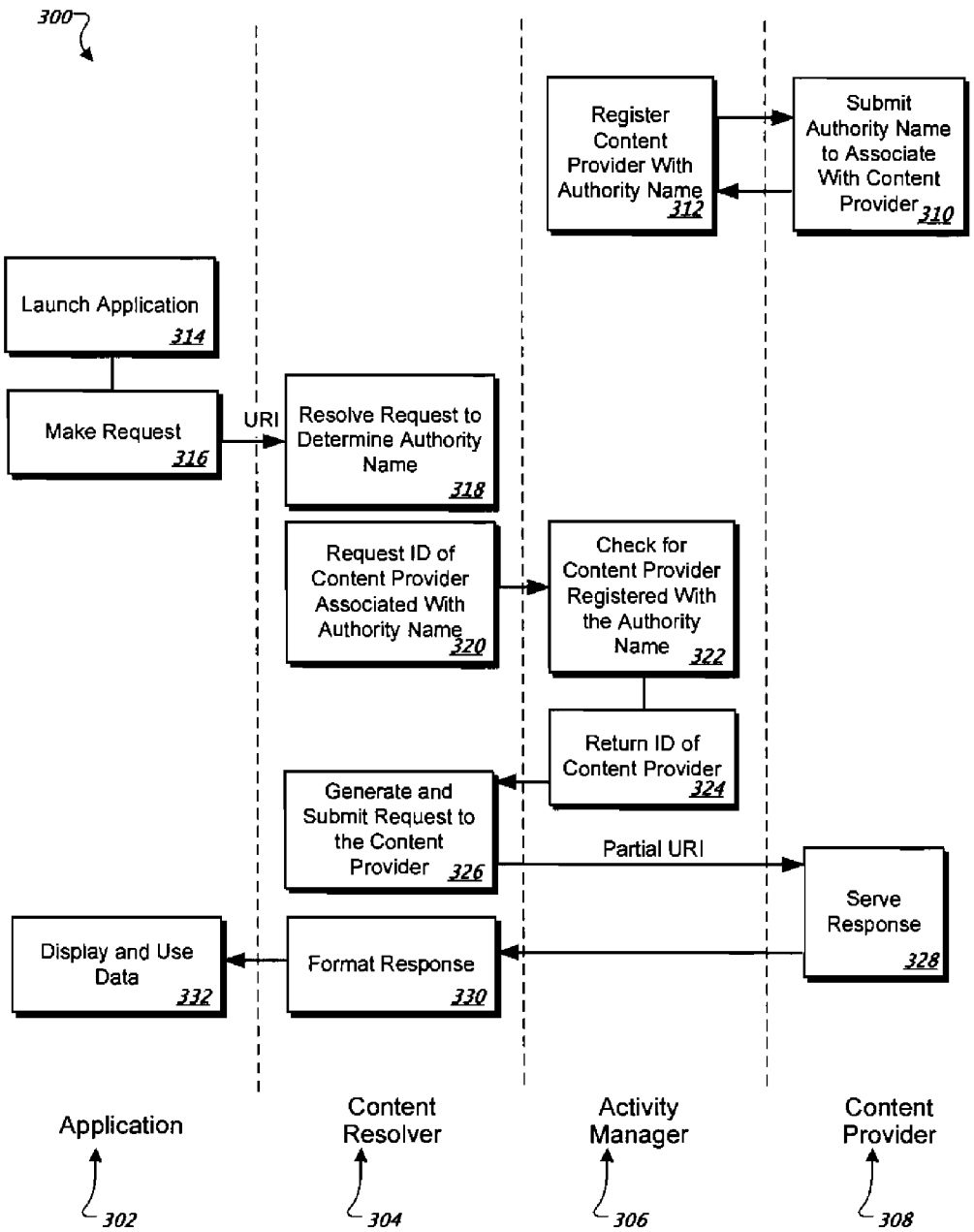
FIG. 3 is a sequence diagram indicating exemplary interactions between an application, a content resolver, an activity manager, and a content provider.

FIG. 3 is a sequence diagram indicating exemplary interactions 300 between an application 302, a content resolver 304, an activity manager 306, and a content provider 308. In a registration step 310, an authority name is submitted by the content provider 308 to the activity manager 306 in order to associate the submitting content provider with the authority name. In a registration step 312, the activity manager 306 registers the content provider with the authority name. For example, the activity manager 306 can insert an entry in a registry or index that associates the authority name with and identifier (ID) associated with the content provider.

In some implementations, the registration steps 310 and 312 can occur when a content provider is installed on a device. For example, the application 302 and the content provider 308 that services the application can be installed on the device at the same time. When the application 302 and the content provider 308 are installed, the content provider 308 can transmit a request to the activity manager 306 to register the content provider 308 with a particular authority name. In this example, the registration of the authority name permits the content provider 308 to service requests having URIs that are associated with registered authority name.

In some implementations, the activity manager 306 also registers authority scopes when the authority name is registered. An authority scope can include a permission set that indicates what activities the content provider 308 is authorized to perform on the device. For example, an authority scope can include whether a content provider has permission to read from the device, write to the device, and which memory portions the content provider can access (e.g., some memory areas of the device can be restricted such as areas including login information or other identifying information about a user of the device).

In another implementation, applications are assigned authority scopes. When an application is installed, the activity manager 306 can assign authority scopes to the application in a similar way that authority scopes can be assigned to a content provider. For example, the application 302 may have an authority scope giving it permission to request data from the content provider 308 but not to write data to the content provider 308 (which in turn would write the data to a data store on the device).

As previously discussed, in some implementations, authorization scopes are assigned based on whether an application or content provider has been approved by a third party. For example, the activity manager 306 may not authorize the content provider 308 (or application 302) to write data to a device unless the content provider 308 includes a digital signature of a third-party (e.g., a company that developed the operating platform 200, a company that manufactures or sells the device, a company that enforces digital security such as VERISIGN, etc.).

In some implementations, a corresponding content provider is not installed when an application is installed. Instead, the newly installed application can use a previously installed content provider to service the application's requests. For example, a set of core content providers can be shipped with the device. Application developers can develop applications that request data that is managed by the core content providers without having to develop a separate content provider to managed data associated with the developed applications. The developed applications can include authority names for the core content providers in their requests for data managed by the core content providers.

Some examples of core content providers are a calendar content provider that manages calendar data such as events occurring on calendar days; an email content provider that manages email data such as email addresses and generation of emails; a SMS content provider that manages generation of SMS messages and SMS numbers; a contacts content provider that manages email addresses, phone numbers, and contact names; network content provider that manages cellular network information used to connect to cellular networks, an instant messaging (IM) content provider that manages IM addresses, generation of IM messages, icons inserted in the IM messages; a SIM content provider that manages writing and reading from a SIM card on a device; a phone settings content provider that manages ring loudness, number of rings, outgoing messages; an alarm content provider that manages alarm settings on a device; media content provider that manages images, audio, and video stored on a device; and a login content provider that manages login information used to authorize a user for online web sites or applications.

In some implementations, different content providers can both manage the same data. For example, both the email content provider and the contacts content provider can retrieve email addresses. Additionally, the same information can be represented by more than one URI. For example, different content providers can access the same data using the URIs "content://email/email_address" and "content://contacts/email." The email content provider can access the email addresses using the former URI, and the contacts content provider can access the email addresses using the latter URI.

After the registration steps 310, 312, a user can launch an application 314. For example, a user can launch a clock application on a cell phone. The application can make a request 316 for data. For example, a user may select an "alarm" option within the clock application. Selection of the alarm option can cause the application 302 to request alarms for display to the user. For instance, the alarms can include visual or audio alerts that signal to a user that a certain time or event has occurred. The alarm times can be stored on the cell phone, so the application 342 issues the request 316 to retrieve the alarm times.

The request 316 can include a URI "content://clock/alarm." In step 318, the content resolver 304 can resolve the request to determine the authority name. For example, the content resolver 304 can parse the URI "content://clock/alarm" to determine that the authority name is "clock."

In step 320, the content resolver 304 can request an ID of the content provider 308 associated with the authority name. For example, the content resolver 304 can transmit the authority name to the activity manager 306.

The activity manager 306 can check for a content provider that is registered with the authority name in step 322. For example, the activity manager 306 can access a registry or index that correlates authority names to content providers. In step 324, the activity manager 306 can return the ID of the content provider to the content resolver 304. For example, if the authority name is "clock," the activity manager 306 may determine that the content provider is "clock content provider." The activity manager 306 can return an ID associated with the clock content provider to the content resolver 304.

The content resolver 364 can submit a request based on the application's request to the identified content provider in step 326. For example, a content resolver 304 can use the ID returned from the activity manager 306 to identify the content provider 308 and can send the application's request to the identified content provider 308. The request can include some or all of the URI originally included in application's request. For example, in some implementations, the content resolver 304 can pass strings in a URI that are appended to the authority name to the identified content provider. For instance, if the application 302 transmits the URI "content://clock/alarm," the content resolver 304 can transmit the string "alarm" to the clock content provider. In other implementations, the content resolver 304 transmits the full URI, which can be parsed at that content provider 348 to determine an appropriate action to initiate.

In step 328, the content provider 348 can serve a response. For example, the clock content provider can use the "alarm" string (or the full URI "content://clock/alarm") to identify and retrieve alarm times stored on the device. In some implementations, the content provider can interpret the URI or a portion of the URI to determine a memory location from which to retrieve the data. For example, the clock content provider may read from a particular "clock" database that stores information specific to the clock content provider. When the clock content provider processes a request to read "content://clock/alarm/1," the clock content provider can read from the "alarm" table in the "clock" database and return the requested column(s), which is column "1" in this example.

In the response to the request, the content provider 308 can transmit data or an indication that the operation is completed (e.g., in a case were data is written to the device) to the content resolver 304. The content resolver 304 can format the response if necessary and forward it to the application 302 for display or other use as indicated in step 332. For example, the clock application can present the retrieved alarm times to a user of the device. The user can edit, enable, or otherwise interact with the alarm times using the application 302.

Figure 4:
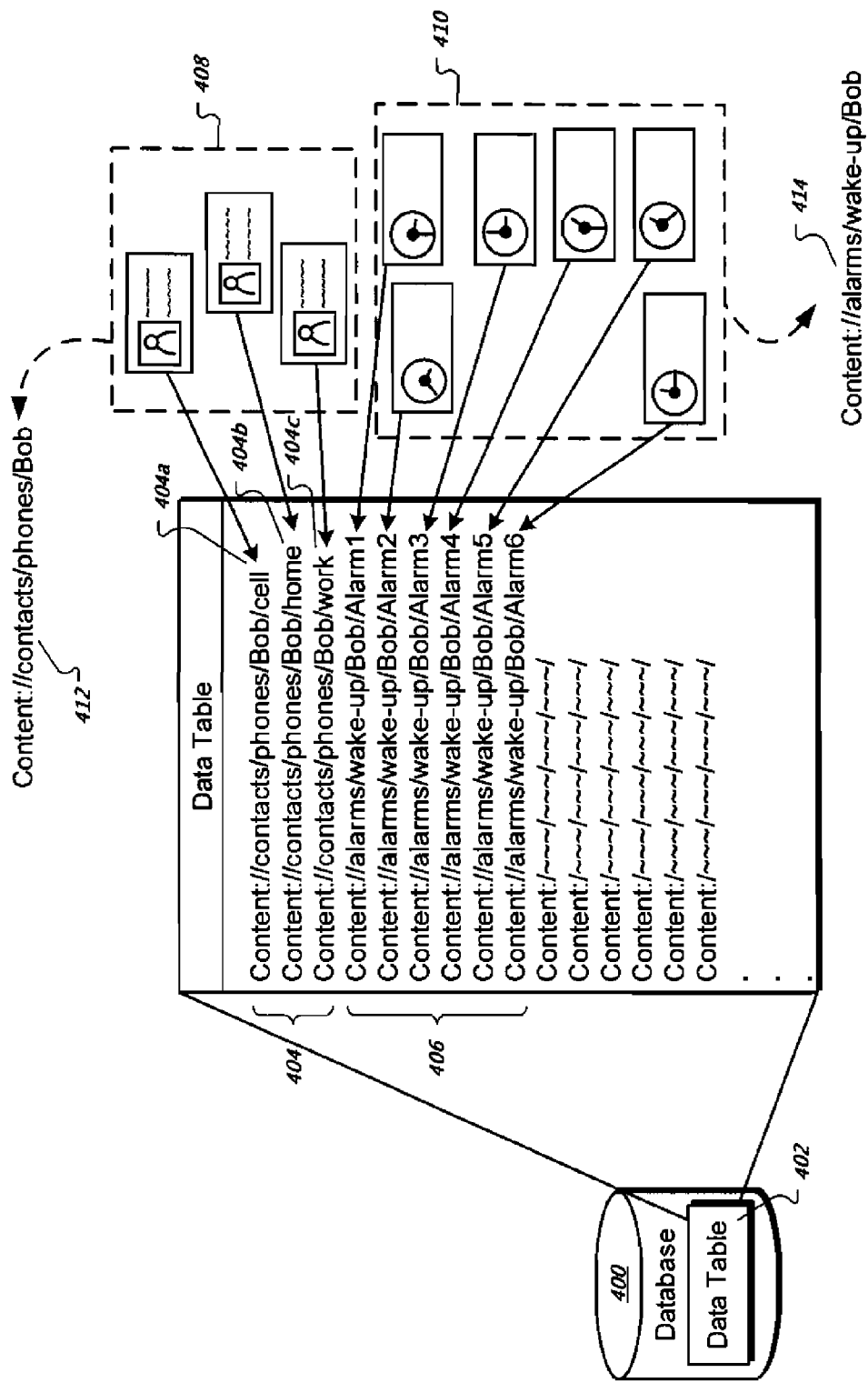
FIG. 4 is an exemplary database that includes content indexed by URIs.

FIG. 4 is an exemplary database 400 that includes content indexed by URIs. The database 400 includes a data table 402, which in turn includes URIs that represent content stored on a device (not shown). A first set of URIs includes contact information 404 and a second set of URIs includes alarm information 406. The contact information 404 includes phone numbers for a user Bob. More specifically, it includes Bob's cellular telephone number 404a, Bob's home telephone number 40b, and Bob's work telephone number 404c.

In some implementations, each of the URIs can represent, for example, a row within a database that includes contact information for Bob. In other implementations, each of the URIs can represent a portion of a row or several rows within a database as described more fully below. Additionally, in some implementations, each content provider can be associated with a corresponding database so that each of the URIs represent rows in different databases. For example, a URI "content://contacts/phones/Bob/cell" can specify information in a "contacts" database and a URI ""content://alarms/wake-up/Bob" can specify information in an "alarms" database.

In certain implementations, the hierarchical structure of the URI influences the data retrieved by a content provider from the database 400. For example, if an application requests data having the URI "content://contacts/phones/Bob/cell," a contacts content provider can retrieve only Bob's cellular telephone number using this URI. If the URI "content://contacts/phones/Bob" 412 is used to request data, the contacts content provider can retrieve the first group of contact data 404 that includes all the phone numbers for Bob. The grouping of the contact data 404 is indicated in FIG. 4 by a dashed box 408 drawn around contact cards representing Bob's telephone numbers. The fact that all the contact information for Bob is associated with the URL "content://contacts/phones/Bob" 412 is indicated by a dashed arrow that links Bob's contact cards within the dashed box 408 to the URI 412.

In another example, if the request includes a URI "content://contacts/phones," the database 400 can return all the phone numbers for all contacts stored on the device (e.g., not just the phone numbers for Bob). In yet another example, if the request includes a URI "content://contacts," the database can return contact information for all contacts including email addresses, contact names, address information, and personal notes, as well as the telephone numbers for the contacts.

Similarly, the second set of URIs 406 can represent alarm times stored on the device. A request having a URI "content://alarms/wake-up/Bob" 414 can return alarm times that Bob has set (e.g., alarms 1-6). In FIG. 4, the alarm times are represented by clock faces enclosed in a dashed box 410. Retrieval of all the alarm times as previously described is indicated using an arrow that links the dashed box 410 to the URI 414. As discussed above, more specific or general information can be retrieved based on the hierarchical structure of a URI used to request data from the database 400. For example, a content provider can request a specific alarm time such as an alarm time for alarm 6 by using the URI "conent://alarms/wake-up/Bob/alarm6."

Figure 5:
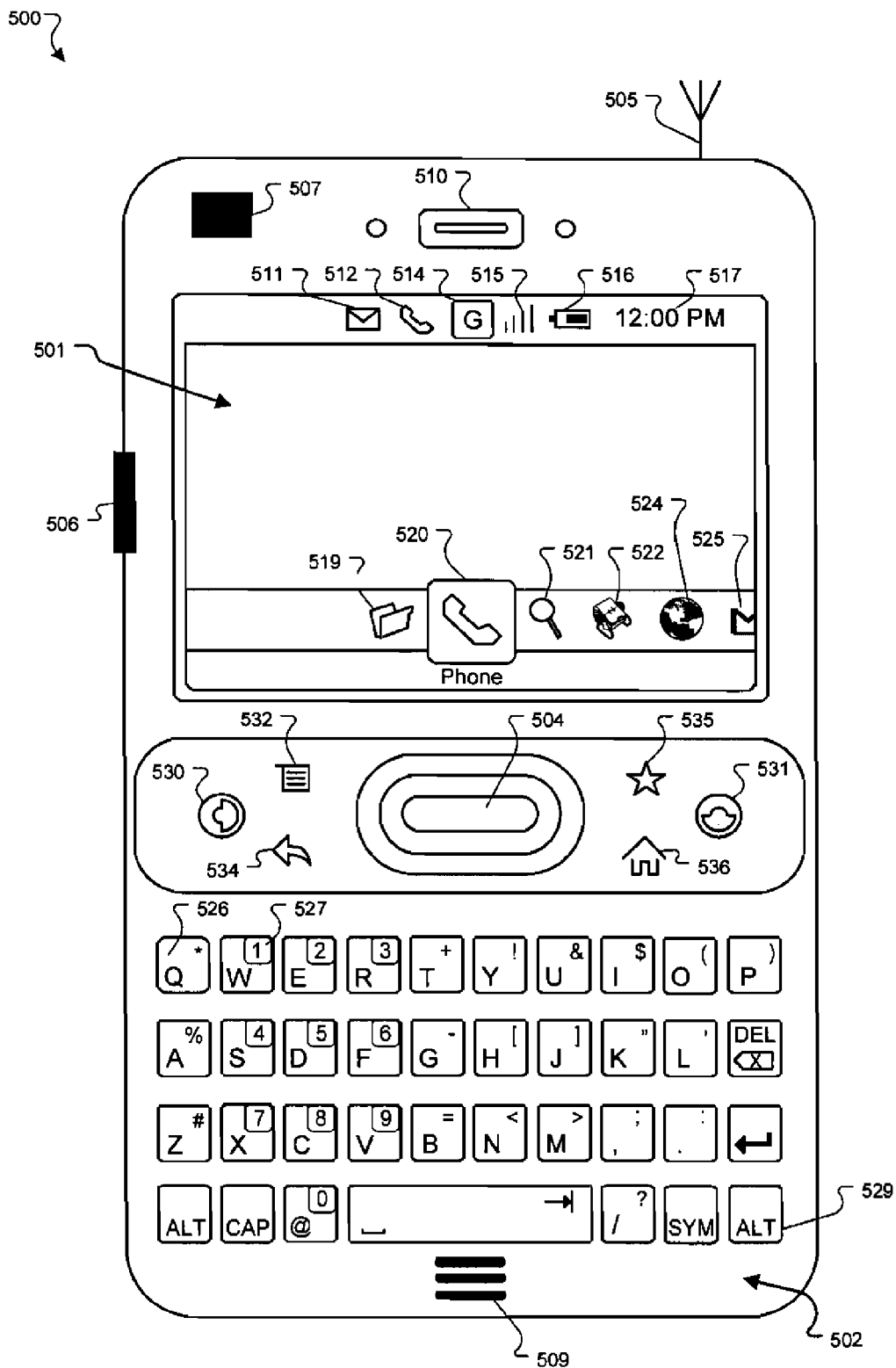
FIG. 5 is a schematic representation of an exemplary mobile device that implements embodiments of the content mapping described herein.

Referring now to FIG. 5, the exterior appearance of an exemplary device 500 that implements the content mapping is illustrated. Briefly, and among other things, the device 500 includes a processor configured to map substantially all content accessed by applications of the device 500, where the content is mapped using URIs.

In more detail, the hardware environment of the device 500 includes a display 501 for displaying text, images, and video to a user; a keyboard 502 for entering text data and user commands into the device 500; a pointing device 504 for pointing, selecting, and adjusting objects displayed on the display 501; an antenna 505; a network connection 506; a camera 507; a microphone 509; and a speaker 510. Although the device 500 shows an external antenna 505, the device 500 can include an internal antenna, which is not visible to the user.

The display 501 can display video, graphics, images, and text that make up the user interface for the software applications used by the device 500, and the operating system programs used to operate the device 500. Among the possible elements that may be displayed on the display 501 are a new mail indicator 511 that alerts a user to the presence of a new message; an active call indicator 512 that indicates that a telephone call is being received, placed, or is occurring; a data standard indicator 514 that indicates the data standard currently being used by the device 500 to transmit and receive data; a signal strength indicator 515 that indicates a measurement of the strength of a signal received by via the antenna 505, such as by using signal strength bars; a battery life indicator 516 that indicates a measurement of the remaining battery life; or a clock 517 that outputs the current time.

The display 501 may also show application icons representing various applications available to the user, such as a web browser application icon 519, a phone application icon 520, a search application icon 521, a contacts application icon 522, a mapping application icon 524, an email application icon 525, or other application icons. In one example implementation, the display 501 is a quarter video graphics array (QVGA) thin film transistor (TFT) liquid crystal display (LCD), capable of 16-bit or better color.

A user uses the keyboard (or "keypad") 502 to enter commands and data to operate and control the operating system and applications that request content from the device or that write content to the device. The keyboard 502 includes standard keyboard buttons or keys associated with alphanumeric characters, such as keys 526 and 527 that are associated with the alphanumeric characters "Q" and "W" when selected alone, or are associated with the characters "*" and "1" when pressed in combination with key 529. A single key may also be associated with special characters or functions, including unlabeled functions, based upon the state of the operating system or applications invoked by the operating system. For example, when an application calls for the input of a numeric character, a selection of the key 527 alone may cause a "1" to be input.

In addition to keys traditionally associated with an alphanumeric keypad, the keyboard 502 also includes other special function keys, such as an establish call key 530 that causes a received call to be answered or a new call to be originated; a terminate call key 531 that causes the termination of an active call; a drop down menu key 532 that causes a menu to appear within the display 501; a backward navigation key 534 that causes a previously accessed network address to be accessed again; a favorites key 535 that causes an active web page to be placed in a bookmarks folder of favorite sites, or causes a bookmarks folder to appear; a home page key 536 that causes an application invoked on the device 500 to navigate to a predetermined network address; or other keys that provide for multiple-way navigation, application selection, and power and volume control.

The user uses the pointing device 504 to select and adjust graphics and text objects displayed on the display 501 as part of the interaction with and control of the device 500 and the applications invoked on the device 500. The pointing device 504 is any appropriate type of pointing device, and may be a joystick, a trackball, a touch-pad, a camera, a voice input device, a touch screen device implemented in combination with the display 501, or any other input device.

The antenna 505, which can be an external antenna or an internal antenna, is a directional or omni-directional antenna used for the transmission and reception of radiofrequency (RF) signals that implement point-to-point radio communication, wireless local area network (LAN) communication, or location determination. The antenna 505 may facilitate point-to-point radio communication using the Specialized Mobile Radio (SMR), cellular, or Personal Communication Service (PCS) frequency bands, and may implement the transmission of data using any number or data standards. For example, the antenna 505 may allow data to be transmitted between the device 500 and a base station using technologies such as Wireless Broadband (WiBro), Worldwide Interoperability for Microwave ACCess (WiMAX), 3GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Auto-radiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM9200A chipset with an QUALCOMM RTR8285 transceiver and PM9740 power management circuit.

The wireless or wired computer network connection 506 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 506 may connect to a LAN network, a corporate or government WAN network, the Internet, a telephone network, or other network. The network connection 506 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE FIREWIRE connector, a Universal Serial Bus (USB) connector (including a mini-B USB interface connector), a serial port connector, a parallel port connector, or other wired connector. In another implementation, the functions of the network connection 506 and the antenna 505 are integrated into a single component.

The camera 507 allows the device 500 to capture digital images, and may be a scanner, a digital still camera, a digital video camera, other digital input device. In one example implementation, the camera 507 is a 3 mega-pixel (MP) camera that utilizes a complementary metal-oxide semiconductor (CMOS).

The microphone 509 allows the device 500 to capture sound, and may be an omni-directional microphone, a unidirectional microphone, a bi-directional microphone, a shotgun microphone, or other type of apparatus that converts sound to an electrical signal. The microphone 509 may be used to capture sound generated by a user, for example when the user is speaking to another user during a telephone call via the device 500. Conversely, the speaker 510 allows the device to convert an electrical signal into sound, such as a voice from another user generated by a telephone application program, or a ring tone generated from a ring tone application program. Furthermore, although the device 500 is illustrated in FIG. 5 as a handheld device, in further implementations the device 500 may be a laptop, a workstation, a midrange computer, a mainframe, an embedded system, telephone, desktop PC, a tablet computer, a PDA, or other type of computing device.

Figure 6:
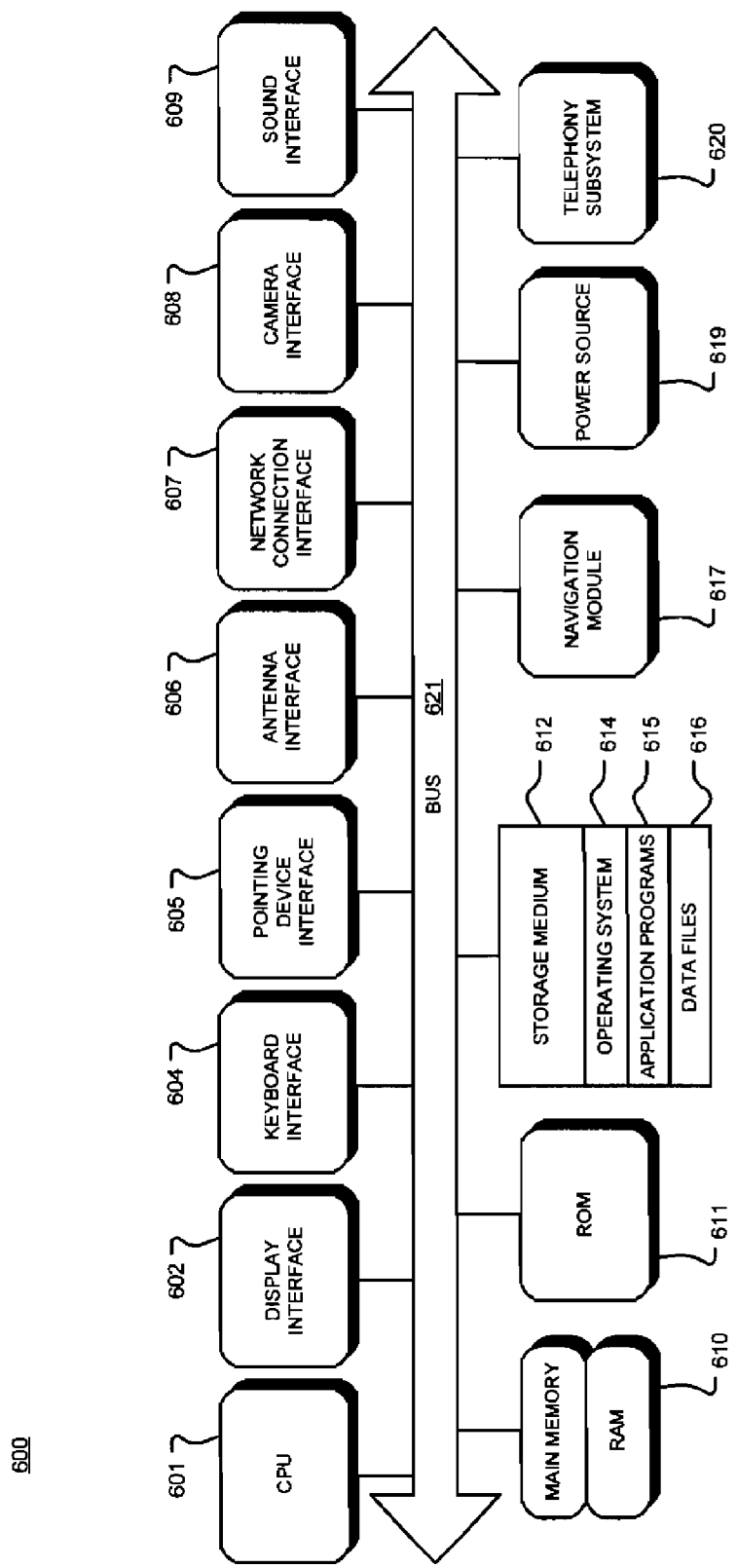
FIG. 6 is a block diagram illustrating the internal architecture of the device of FIG. 5.

FIG. 6 is a block diagram illustrating an internal architecture 600 of the device 500. The architecture includes a central processing unit (CPU) 601 where the computer instructions that comprise an operating system or an application are processed; a display interface 602 that provides a communication interface and processing functions for rendering video, graphics, images, and texts on the display 501, provides a set of built-in controls (such as buttons, text and lists), and supports diverse screen sizes; a keyboard interface 604 that provides a communication interface to the keyboard 502; a pointing device interface 605 that provides a communication interface to the pointing device 504; an antenna interface 606 that provides a communication interface to the antenna 505; a network connection interface 607 that provides a communication interface to a network over the computer network connection 506; a camera interface 608 that provides a communication interface and processing functions for capturing digital images from the camera 507; a sound interface 609 that provides a communication interface for converting sound into electrical signals using the microphone 509 and for converting electrical signals into sound using the speaker 510; a random access memory (RAM) 610 where computer instructions and data are stored in a volatile memory device for processing by the CPU 601; a read-only memory (ROM) 611 where invariant low-level systems code or data for basic system functions such as basic input and output (I/O), startup, or reception of keystrokes from the keyboard 502 are stored in a non-volatile memory device; a storage medium 612 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 614, application programs 615 (including, for example, a web browser application, a widget or gadget engine, and or other applications, as necessary) and data files 616 are stored; a navigation module 617 that provides a real-world or relative position or geographic location of the device 500; a power source 619 that provides an appropriate alternating current (AC) or direct current (DC) to power components; and a telephony subsystem 620 that allows the device 500 to transmit and receive sound over a telephone network. The constituent devices and the CPU 601 communicate with each other over a bus 621.

The CPU 601 can be one of a number of computer processors. In one arrangement, the computer CPU 601 is more than one processing unit. The RAM 610 interfaces with the computer bus 621 so as to provide quick RAM storage to the CPU 601 during the execution of software programs such as the operating system application programs, and device drivers. More specifically, the CPU 601 loads computer-executable process steps from the storage medium 612 or other media into a field of the RAM 610 in order to execute software programs. Data is stored in the RAM 610, where the data is accessed by the computer CPU 601 during execution. In one example configuration, the device 500 includes at least 128 MB of RAM, and 256 MB of flash memory.

The storage medium 612 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 500 to access computer-executable process steps, application programs and the like, stored on removable and non-removable memory media, to off-load data from the device 500, or to upload data onto the device 500.

A computer program product is tangibly embodied in storage medium 612, a machine-readable storage medium. The computer program product includes instructions that, when read by a machine, operate to cause a data processing apparatus to store image data in the mobile device. In some embodiments, the computer program product includes instructions that perform operations including mapping content stored on a device using URIs, receiving requests having URIs from applications (where the requests are received at a universal interface), and retrieving data from (or writing data to) the device using content providers that manage the data.

The operating system 614 may be a LINUX-based operating system such as the ANDROID mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 614 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON, FLASH LITE, or MICROSOFT .NET Compact, or another appropriate environment.

The device stores computer-executable code for the operating system 614, and the application programs 615 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 615 may also include a widget or gadget engine, such as a TAFRI widget engine, a MICROSOFT gadget engine such as the WINDOWS SIDEBAR gadget engine or the KAPSULES gadget engine, a YAHOO! widget engine such as the KONFABULTOR widget engine, the APPLE DASHBOARD widget engine, the GOOGLE gadget engine, the KLIPFOLIO widget engine, an OPERA widget engine, the WIDSETS widget engine, a proprietary widget or gadget engine, or other widget or gadget engine the provides host system software for a physically-inspired applet on a desktop.

Although it is possible to specify content using URIs and interact with the URIs via universal interface using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 617 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 617 may also be used to measure angular displacement, orientation, or velocity of the device 500, such as by using one or more accelerometers.

Figure 7:
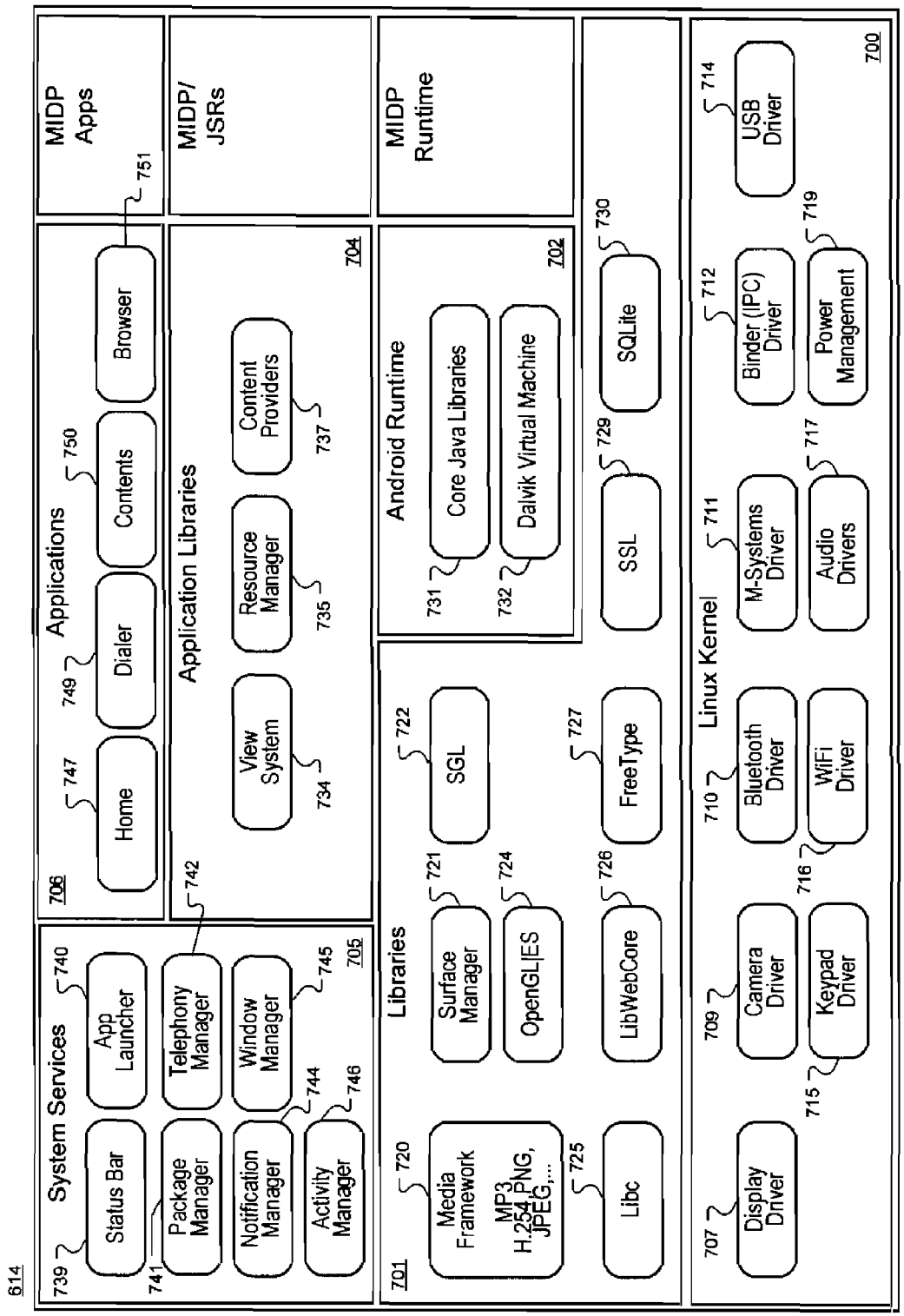
FIG. 7 is a block diagram illustrating exemplary components of the operating system used by the device of FIG. 5.

FIG. 7 is a block diagram illustrating exemplary components of the operating system 614 used by the device 500, in the case where the operating system 614 is the ANDROID mobile device platform. The operating system 614 invokes multiple processes, while ensuring that the associated phone application is responsive, and that wayward applications do not cause a fault (or "crash") of the operating system. Using task switching, the operating system 614 allows for the switching of applications while on a telephone call, without losing the state of each associated application. The operating system 614 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 614 can generally be organized into six components: a kernel 700, libraries 701, an operating system runtime 702, application libraries 704, system services 705, and applications 706. The kernel 700 includes a display driver 707 that allows software such as the operating system 614 and the application programs 615 to interact with the display 501 via the display interface 602, a camera driver 709 that allows the software to interact with the camera 507; a BLUETOOTH driver 710; a M-Systems driver 711; a binder (IPC) driver 712, a USB driver 714 a keypad driver 715 that allows the software to interact with the keyboard 502 via the keyboard interface 604; a WiFi driver 716; audio drivers 717 that allow the software to interact with the microphone 509 and the speaker 510 via the sound interface 609; and a power management component 719 that allows the software to interact with and manage the power source 719.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 701 include a media framework 720 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 721; a simple graphics library (SGL) 722 for two-dimensional application drawing; an Open Graphics Library for Embedded Systems (OpenGL ES) 724 for gaming and three-dimensional rendering; a C standard library (LIBC) 725; a LIBWEBCORE library 726; a FreeType library 727; an SSL 729; and an SQLite library 730.

The operating system runtime 702 includes core JAVA libraries 731, and a Dalvik virtual machine 732. The Dalvik virtual machine 732 is a custom, virtual machine that runs a customized file format (.DEX).

The operating system 614 can also include Mobile Information Device Profile (MIDP) components such as the MIDP JAVA Specification Requests (JSRs) components, MIDP runtime, and MIDP applications as shown in FIG. 7. The MIDP components can support MIDP applications running on the device 500.

With regard to graphics rendering, a system-wide composer manages surfaces and a frame buffer and handles window transitions, using the OpenGL ES 724 and two-dimensional hardware accelerators for its compositions.

The Dalvik virtual machine 732 may be used with an embedded environment, since it uses runtime memory very efficiently, implements a CPU-optimized byte code interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated byte codes are designed for quick interpretation, since register-based instead of stack-based instructions reduce memory and dispatch overhead, since using fixed width instructions simplifies parsing, and since the 16-bit code units minimize reads.

The application libraries 704 include a view system 734, a resource manager 735, and content providers 737. The system services 705 includes a status bar 739; an application launcher 740; a package manager 741 that maintains information for all installed applications; a telephony manager 742 that provides an application level JAVA interface to the telephony subsystem 620; a notification manager 744 that allows all applications access to the status bar and on-screen notifications; a window manager 745 that allows multiple applications with multiple windows to share the display 501; and an activity manager 746 that runs each application in a separate process, manages an application life cycle, and maintains a cross-application history.

The applications 706 include a home application 747, a dialer application 749, a contacts application 750, and a browser application 751.

The telephony manager 742 provides event notifications (such as phone state, network state, Subscriber Identity Module (SIM) status, or voicemail status), allows access to state information (such as network information, SIM information, or voicemail presence), initiates calls, and queries and controls the call state. The browser application 751 renders web pages in a full, desktop-like manager, including navigation functions. Furthermore, the browser application 751 allows single column, small screen rendering, and provides for the embedding of HTML views into other applications.

Figure 8:
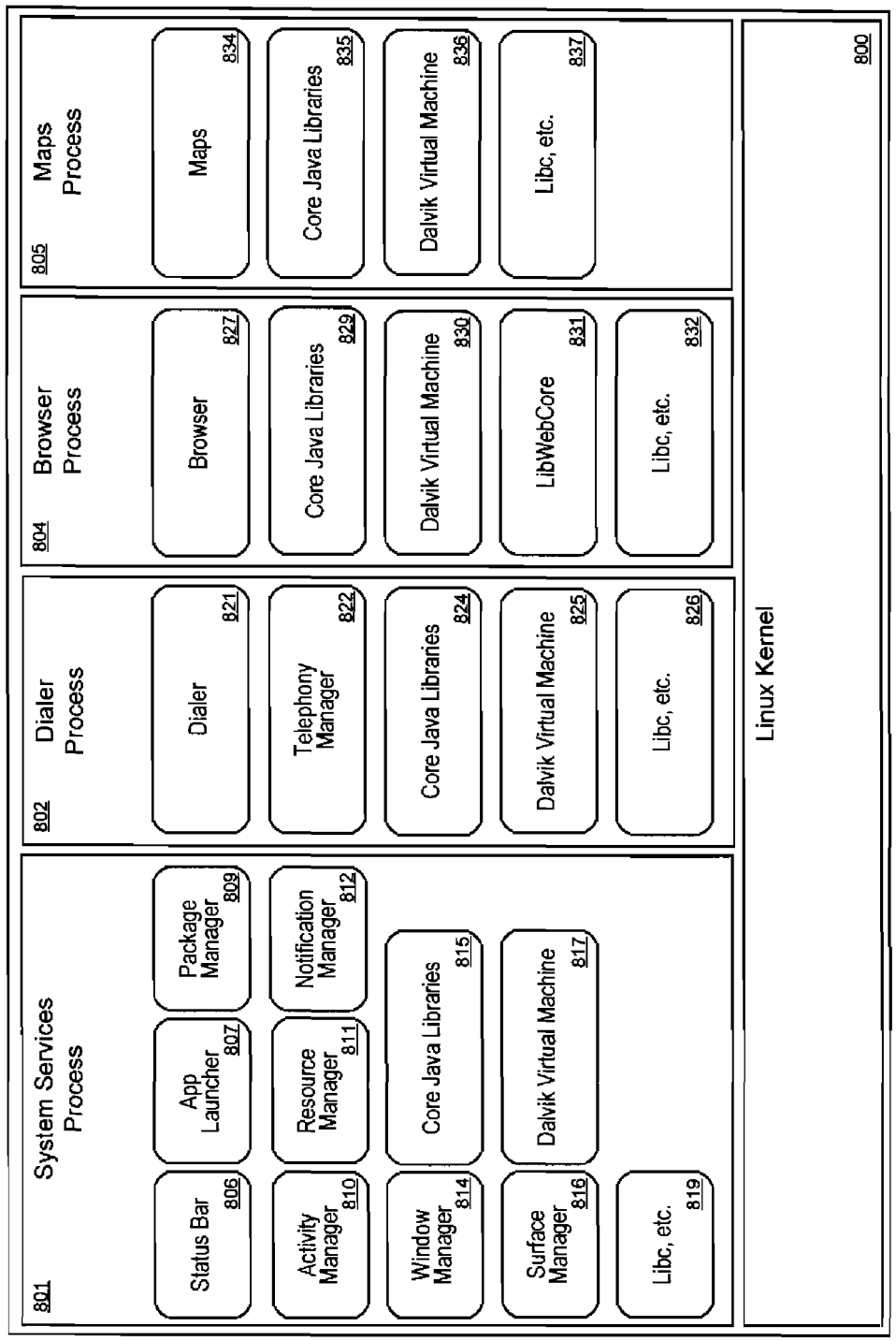
FIG. 8 is a block diagram illustrating exemplary processes implemented by the operating system kernel of FIG. 7.

FIG. 8 is a block diagram illustrating exemplary processes implemented by the operating system kernel 800. Generally, applications and system services run in separate processes, where the activity manager 746 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 816, the window manager 814, or the activity manager 810 can be continuously executed while the device 500 is powered. Additionally, some application-specific process can also be persistent. For example, processes associated with the dialer application 821, may also be persistent.

The processes implemented by the operating system kernel 800 may generally be categorized as system services processes 801, dialer processes 802, browser processes 804, and maps processes 805. The system services processes 801 include status bar processes 806 associated with the status bar 739; application launcher processes 807 associated with the application launcher 740; package manager processes 809 associated with the package manager 741; activity manager processes 810 associated with the activity manager 746; resource manager processes 811 associated with a resource manager 811 that provides access to graphics, localized strings, and XML layout descriptions; notification manger processes 812 associated with the notification manager 744; window manager processes 814 associated with the window manager 745; core JAVA libraries processes 815 associated with the core JAVA libraries 731; surface manager processes 816 associated with the surface manager 721; Dalvik virtual machine processes 817 associated with the Dalvik virtual machine 732, and LIBC processes 819 associated with the LIBC library 725.

The dialer processes 802 include dialer application processes 821 associated with the dialer application 749; telephony manager processes 822 associated with the telephony manager 742; core JAVA libraries processes 824 associated with the core JAVA libraries 731; Dalvik virtual machine processes 825 associated with the Dalvik Virtual machine 732; and LIBC processes 826 associated with the LIBC library 725. The browser processes 804 include browser application processes 827 associated with the browser application 751; core JAVA libraries processes 829 associated with the core JAVA libraries 731; Dalvik virtual machine processes 830 associated with the Dalvik virtual machine 732; LIBWEBCORE processes 831 associated with the LIBWEBCORE library 726; and LIBC processes 832 associated with the LIBC library 725.

The maps processes 805 include maps application processes 834, core JAVA libraries processes 835, Dalvik virtual machine processes 836, and LIBC processes 837. Notably, some processes, such as the Dalvik virtual machine processes, may exist within one or more of the systems services processes 801, the dialer processes 802, the browser processes 804, and the maps processes 805.

Figure 9:
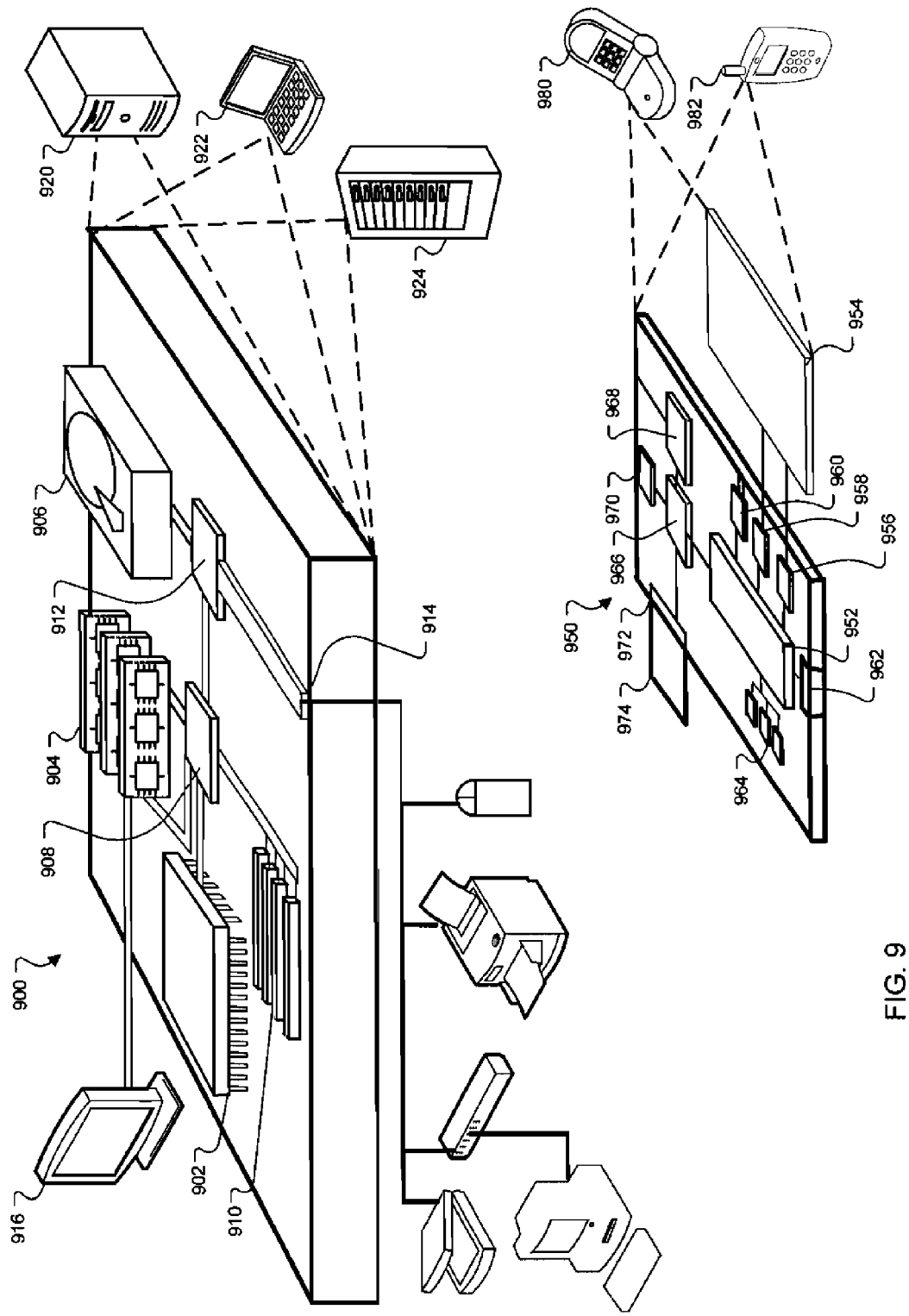
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, the content resolver 210 or activity manager 212 can identify that a request having a URI is not for data stored on the device if the URI includes the string "http" instead of "content." For example, the content resolver (or activity manager) can start a browser to handle messages that include a string such as http://www.cnn.com instead of using the string to retrieve or write data to the device.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method performed by a computing device having a memory and processor configured to execute multiple applications, the method comprising:

maintaining, in the memory of the computing device: multiple sets of distinct content items, wherein each set includes one or more content items having a different content type, multiple content providers, each content provider associated with a different content type, multiple applications configured to submit requests for one or more content items;

a data structure containing multiple Uniform Resource Indicators (URI), a URI including an indication of a content type and a reference to a content item, and a universal interface configured to:

receive a request from any of the multiple applications for a content item stored in the memory of the computing device, the request including an entire URI or a truncated URI, and alone or in conjunction with an activity manager, using the data structure and the entire URI or the truncated URI to determine which content provider separate from the requesting application is to respond to the request and identify one or more content items responsive to the request;

receiving, by the universal interface, a request for a particular content item from a first application of the multiple applications, the request including a truncated URI;

alone or in conjunction with the activity manager, using, by the universal interface, the data structure and the entire URI or the truncated URI to determine a particular content provider that is separate from the first application to respond to the request;

using, by the particular content provider, the entire URI or the truncated URI to obtain the content item responsive to the request that is stored in the data structure;

transmitting, with the particular content provider and to the universal interface, the content item that is responsive to the request; and transmitting, with the universal interface, the content item to the at least one requesting application.

2. The method of claim 1, wherein using the data structure and the entire URI or the truncated URI to determine the particulate content provider is to respond to the request comprises parsing the URI to identify an authority name used to specify the content provider.

3. The method of claim 1, wherein the content provider obtains the requested content item using the URI to identify the requested content item in a database.

4. The method of claim 3, wherein a first portion of the URI identifies the content provider and a second portion identifies the requested content item in the database.

5. The method of claim 3, wherein each record in the database is specified with at least one unique URI.

6. The method of claim 3, wherein a group of records is specified using the truncated portion of the URI.

7. The method of claim 1, wherein the content provider obtains the requested content item using the URI to identify the requested content item in a subscriber identity module (SIM) card or a flash memory card.

8. The method of claim 1, wherein using the entire URI or the truncated URI to obtain the content item responsive to the request comprises generating the requested content item by the content provider using information included in the URI.

9. The method of claim 1, further comprising initiating execution of the content provider if the content provider is not executing when the request is received.

10. The method of claim 1, further comprising stopping execution of the content provider after the content provider returns the requested content item.

11. The method of claim 1, further comprising checking a scope of authorization associated with the at least one requesting application before the content provider obtains the requested content item, wherein the authorization comprises a permission setting that specifies whether the at least one requesting application is permitted to receive content items from or transmit content items to the content provider.

12. The method of claim 1, further comprising registering one or more scopes of authorization to associate with the at least one requesting application if the at least one requesting application is digitally signed by a third-party.

13. The method of claim 1, further comprising registering content providers with particular URIs to identify which content providers are responsible for managing content items associated with the particular URIs.

14. The method of claim 1, further comprising receiving a request from the at least one requesting application to store a generated content item, wherein the request comprises the generated content item and a second URI that specifies a logical location to store the generated content item.

15. The method of claim 14, further comprising determining that the content provider is responsible for managing the generated content item based on the second URI and storing the content item based on a location specified by the second URI.

16. The method of claim 1, wherein the content provider services requests for content items from different applications.

17. The method of claim 1, wherein requests for content items from the multiple applications are received at the universal interface.

18. The method of claim 1, wherein content items are provided to the requesting application from content providers through the universal interface.

19. A computer program product tangibly embodied in a non-transitory computer readable storage medium of a computing device, the computer program product including instructions that, when executed by one or more processors, perform operations comprising:
  maintaining:
    multiple sets of distinct content items, wherein each set includes one or more content items having a different content type,
    multiple content providers, each content provider associated with a different content type,
    multiple applications configured to submit requests for one or more content items;
    a data structure containing multiple Uniform Resource Indicators (URI), a URI including an indication of a content type and a reference to a content item, and
    a universal interface configured to:
      receive a request from any of the multiple applications for a content item stored in memory of the computing device, the request including an entire URI or a truncated URI, and
      alone or in conjunction with an activity manager, using the data structure and the entire URI or the truncated URI to determine which content provider separate from the requesting application is to respond to the request and identify one or more content items responsive to the request;
  receiving, by the universal interface, a request for a particular content item from a first application of the multiple applications, the request including a truncated URI;
  alone or in conjunction with the activity manager, using, by the universal interface, the data structure and the entire URI or the truncated URI to
    determine a particular content provider that is separate from the first application to respond to the request;
  using, by the particular content provider, the entire URI or the truncated URI to obtain the content item responsive to the request that is stored in the data structure;
  transmitting, with the particular content provider and to the universal interface, the content item that is responsive to the request; and
  transmitting, with the universal interface, the content item to the at least one requesting application.

20. A system comprising:
one or more computer processors; and
one or more non-transitory computer readable devices that includes instructions that, when executed by the one or more computer processors, causes the processors to perform operations, the operations comprising:
  maintaining:
    multiple sets of distinct content items, wherein each set includes one or more content items having a different content type,
    multiple content providers, each content provider associated with a different content type,
    multiple applications configured to submit requests for one or more content items;
    a data structure containing multiple Uniform Resource Indicators (URI), a URI including an indication of a content type and a reference to a content item, and
    a universal interface configured to:
      receive a request from any of the multiple applications for a content item stored in the one or more non-transitory computer readable devices, the request including an entire URI or a truncated URI, and
      alone or in conjunction with an activity manager, using the data structure and the entire URI or the truncated URI to determine which content provider separate from the requesting application is to respond to the request and identify one or more content items responsive to the request;
  receiving, by the universal interface, a request for a particular content item from a first application of the multiple applications, the request including a truncated URI;
  alone or in conjunction with the activity manager, using, by the universal interface, the data structure and the entire URI or the truncated URI to
    determine a particular content provider that is separate from the first application to respond to the request;
  using, by the particular content provider, the entire URI or the truncated URI to obtain the content item responsive to the request that is stored in the data structure;
  transmitting, with the particular content provider and to the universal interface, the content item that is responsive to the request; and
  transmitting, with the universal interface, the content item to the at least one requesting application.

* * * * *

UNITED STATES PATENT AND TRADEMARK OFFICE
CERTIFICATE OF CORRECTION

| | | |
|---|---|---|
| PATENT NO. | : 8,910,240 B1 | Page 1 of 1 |
| APPLICATION NO. | : 11/938689 | |
| DATED | : December 9, 2014 | |
| INVENTOR(S) | : Jeffrey W. Hamilton et al. | |

It is certified that error appears in the above-identified patent and that said Letters Patent is hereby corrected as shown below:

In the Claims:

Column 20, line 41, in Claim 2 delete "particulate" and insert -- particular --, therefor.

Signed and Sealed this
Twenty-first Day of April, 2015

Michelle K. Lee
*Director of the United States Patent and Trademark Office*